(12) United States Patent
Macfarlane et al.

(10) Patent No.: US 10,089,771 B2
(45) Date of Patent: Oct. 2, 2018

(54) METHOD AND APPARATUS FOR NON-OCCLUDING OVERLAY OF USER INTERFACE OR INFORMATION ELEMENTS ON A CONTEXTUAL MAP

(71) Applicant: HERE Global B.V., Eindhoven (NL)

(72) Inventors: Jane F. Macfarlane, Oakland, CA (US); Craig R. Barnes, Forest Park, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/715,473

(22) Filed: Sep. 26, 2017

(65) Prior Publication Data

US 2018/0018799 A1    Jan. 18, 2018

Related U.S. Application Data

(63) Continuation of application No. 14/282,362, filed on May 20, 2014, now Pat. No. 9,805,487.

(51) Int. Cl.
*G06T 11/60*    (2006.01)
*G01C 21/36*    (2006.01)

(52) U.S. Cl.
CPC .......... *G06T 11/60* (2013.01); *G01C 21/3697* (2013.01)

(58) Field of Classification Search
None
See application file for complete search history.

(56) References Cited

U.S. PATENT DOCUMENTS

| | | | |
|---|---|---|---|
| 6,154,219 A * | 11/2000 | Wiley | G06T 11/60 345/581 |
| 9,532,176 B1 * | 12/2016 | Gordon | H04W 4/025 |
| 2009/0171570 A1 | 7/2009 | Chiba | |
| 2011/0238690 A1 * | 9/2011 | Arrasvuori | G06F 3/04812 707/769 |
| 2013/0249812 A1 * | 9/2013 | Ramos | G06F 3/0481 345/173 |
| 2015/0186414 A1 | 7/2015 | Jones et al. | |

OTHER PUBLICATIONS

Agrawala et al., "Rendering Effective Route Maps: Improving Usability Through Generalization," Stanford University, ACM 2001.
Carpenter, L., "The A-buffer, an Antialiased Hidden Surface Method," Computer Graphics Project, Computer Division, Lucasfilm Ltd. ACM, 1984.
Rajeswari et al., "Automatic Road Extraction based on Normalized Cuts and Level Set Methods," International Journal of Computer Applications, V. 18, No. 7, Mar. 2011.

(Continued)

*Primary Examiner* — Nicholas R Wilson
(74) *Attorney, Agent, or Firm* — Alston & Bird LLP

(57) ABSTRACT

A method, apparatus and computer program product are provided for non-occluding overlay of user interface or information elements on a contextual map. A method is provided for receiving map data and location data, determining, using a processor, relevant map elements based on the location data; and determining an information element overlay area based on the relevant map elements. The overlay areas do not occlude the relevant map elements.

20 Claims, 8 Drawing Sheets

(56) References Cited

OTHER PUBLICATIONS

Zahradnik, F., "Review: Google Maps for iPhone—Maps and GPS Navigation,"2012. http://gps.about.com/od/mobilephonegps/fr/Google-Maps-Iphone-Review.htm.
Office Action for U.S. Appl. No. 14/282,362 dated Dec. 20, 2016.
Office Action for U.S. Appl. No. 14/282,362 dated Mar. 23, 2017.
Office Action for U.S. Appl. No. 14/282,362 dated May 13, 2016.
Office Action for U.S. Appl. No. 14/282,362 dated Sep. 25, 2015.
Notice of Allowance for U.S. Appl. No. 14/282,362 dated Jun. 30, 2017.

* cited by examiner

METHOD AND APPARATUS FOR NON-OCCLUDING OVERLAY OF USER INTERFACE OR INFORMATION ELEMENTS ON A CONTEXTUAL MAP

CROSS-REFERENCE TO RELATED APPLICATIONS

This application is a continuation of and claims priority to U.S. patent application Ser. No. 14/282,362, filed on May 20, 2014, the contents of which are herein incorporated by reference in their entirety.

TECHNOLOGICAL FIELD

An example embodiment of the present invention relates to map rendering and, more particularly, to non-occluding overlay of user interface or information elements on a contextual map.

BACKGROUND

In some map rendering systems every element associated with the current zoom level is shown, e.g. rendered. These map rendering systems do not differentiate whether an element is non-relevant or relevant to the user. As a result, overlaying of additional elements such as user interface elements or information elements, such as pictures, video, or text may occur on top of relevant elements occluding the user's view of these relevant elements.

Other map rendering systems are programmed to render elements based on the context of the current activity of the user. For example, a context map rendering may display streets, sidewalks, over street walkways, paths, and points of interest to a user determined to be a pedestrian. In another example, a user determined to be on a transit system may show the transit schematic. The contextual map renders the relevant elements and deemphasizes the non-relevant elements, by differentiating the focus, color, and/or detail level of the elements, or by not rendering non-relevant elements.

The rendering of additional elements in some map rendering systems may reduce the size of the rendering area to render the additional element outside of the rending area. While this may prevent occluding map elements, it makes the rending smaller and harder for the user to use.

BRIEF SUMMARY

A method and apparatus are provided in accordance with an example embodiment for non-occluding overlay of user interface or information elements on a contextual map. In an example embodiment, a method is provided that includes receiving map data and location data, determining, using a processor, relevant map elements based on the location data, and determining an overlay area based on the relevant map elements. The overlay areas do not occlude the relevant map elements.

In an example embodiment, the method also includes receiving context data. The determining relevant map elements may be further based on the context data. In some example embodiments, this method also includes generating a contextual map based on the map data, the context data, and the overlay area, and causing the contextual map to be rendered on a user interface. In an example embodiment of this method, generating a contextual map comprises overlaying information elements or user interface elements in the overlay area.

In an example embodiment of the method, the determining an overlay area comprises generating a bit mask. In some example embodiments of the method, the determining an overlay area comprises computing a signed distance field. In the method of an example embodiment, the determining an overlay area comprises weighting map elements based on relevance, wherein the information element overlay area may comprise the map elements that satisfy a relevance threshold.

In another example embodiment, an apparatus is provided including at least one processor and at least one memory including computer program code, with the at least one memory and computer program code configured to, with the processor, cause the apparatus to at least receive map data and location data, determine relevant map elements based on the location data, and determine an overlay area based on the relevant map elements. The overlay areas do not occlude the relevant map elements.

In an example embodiment of the apparatus the at least one memory and the computer program code are further configured to receive context data. The determining relevant map elements may be further based on the context data. In an example embodiment of this apparatus, the at least one memory and the computer program code are further configured to generate a contextual map based on the map data, context data, and overlay area and cause the contextual map to be rendered on a user interface. In a further example embodiment of this apparatus, generating a contextual map comprises overlaying information elements or user interface elements in the information overlay area.

In an example embodiment of the apparatus, the determining an overlay area comprises generating a bit mask. In some example embodiments of the apparatus the determining an overlay area comprises computing a signed distance field. In an apparatus of an example embodiment, the determining an overlay area comprises weighting map elements based on relevance, wherein the information element overlay area may comprise the map elements that satisfy a relevance threshold.

In a further example embodiment, a computer program product is provided including at least one non-transitory computer-readable storage medium having computer-executable program portions stored therein, with the computer-executable program code portions comprising program code instructions configured to receive map data and location data, determine relevant map elements based on the location data, and determine an overlay area based on the relevant map elements. The overlay areas do not occlude the relevant map elements.

In an example embodiment of the computer program product, the computer-executable program code portions further comprise program code instructions configured to receive context data. The determining relevant map elements may be further based on the context data. In some example embodiments of this computer program product the computer-executable program code portions further comprise program code instructions configured to generate a contextual map based on the map data, context data, and overlay area. The generating a contextual map may comprise overlaying information elements or user interface elements in the information overlay area. The computer-executable program code portions of this example embodiment also comprise program code instructions configured to cause the contextual map to be rendered on a user interface.

In an example embodiment of the computer program product, the determining an overlay area comprises generating a bit mask. In some example embodiments of the computer program product, the determining an overlay area comprises computing a signed distance field. In a computer program product of an example embodiment, the determining an overlay area comprises weighting map elements based on relevance, wherein the information element overlay area may comprise the map elements that satisfy a relevance threshold.

In yet another example embodiment, an apparatus is provided that includes means for receiving map data and location data, means for determining relevant map elements based on the location data and means for determining an overlay area based on the relevant map elements. The overlay areas do not occlude the relevant map elements.

BRIEF DESCRIPTION OF THE DRAWINGS

Figure 1:
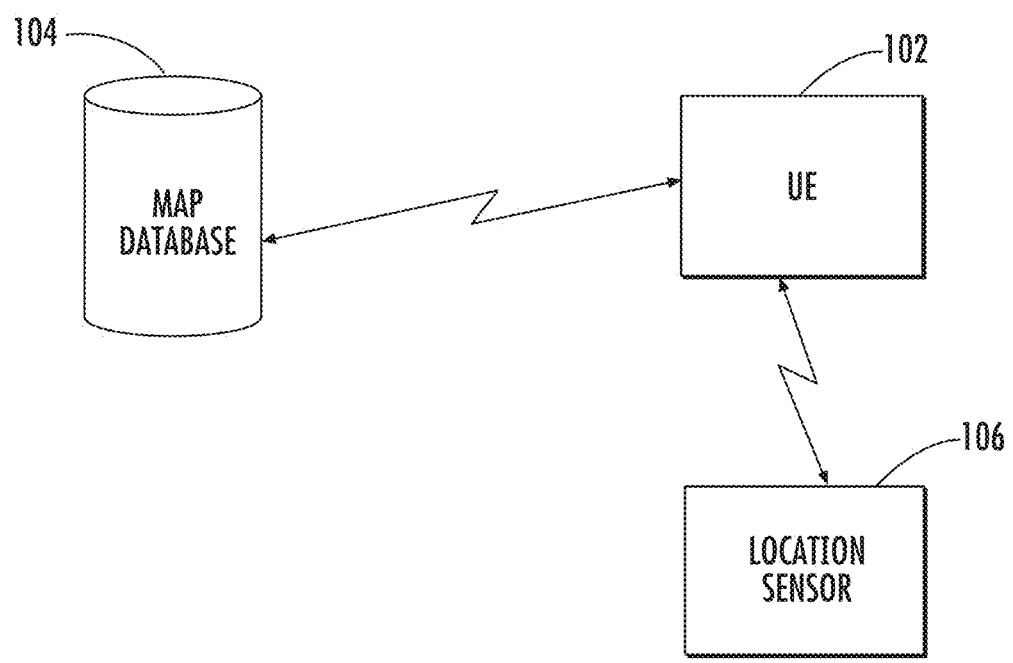
Figure 2:
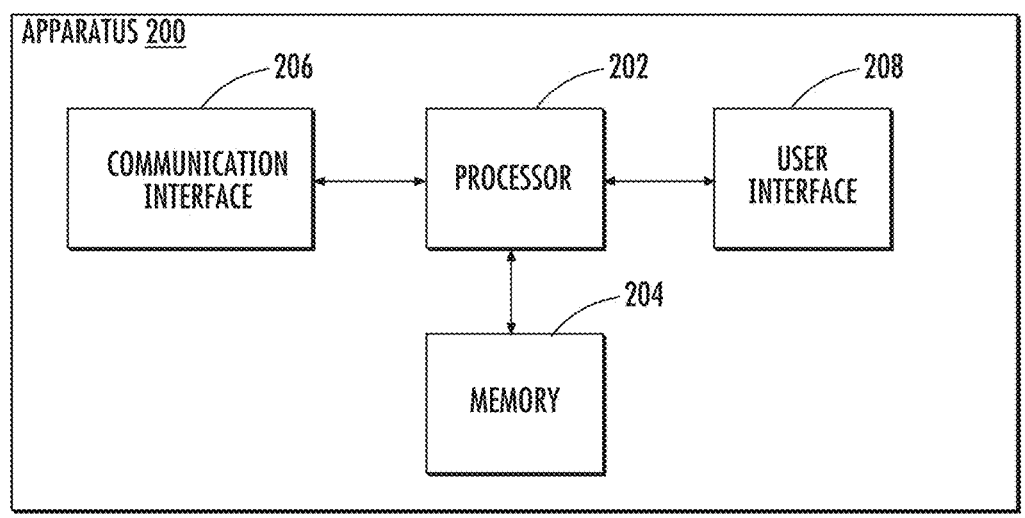
Figure 3:
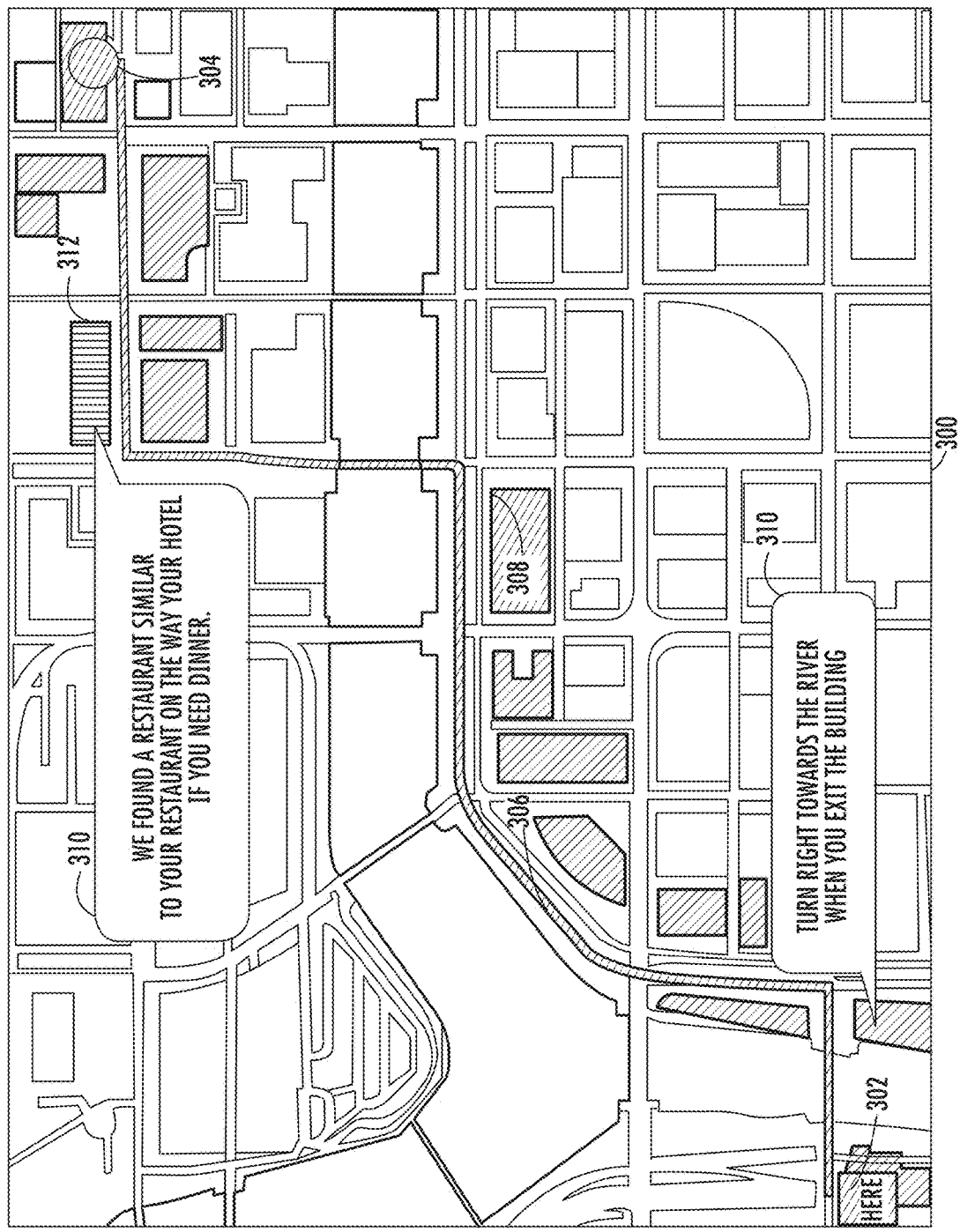
Figure 6:
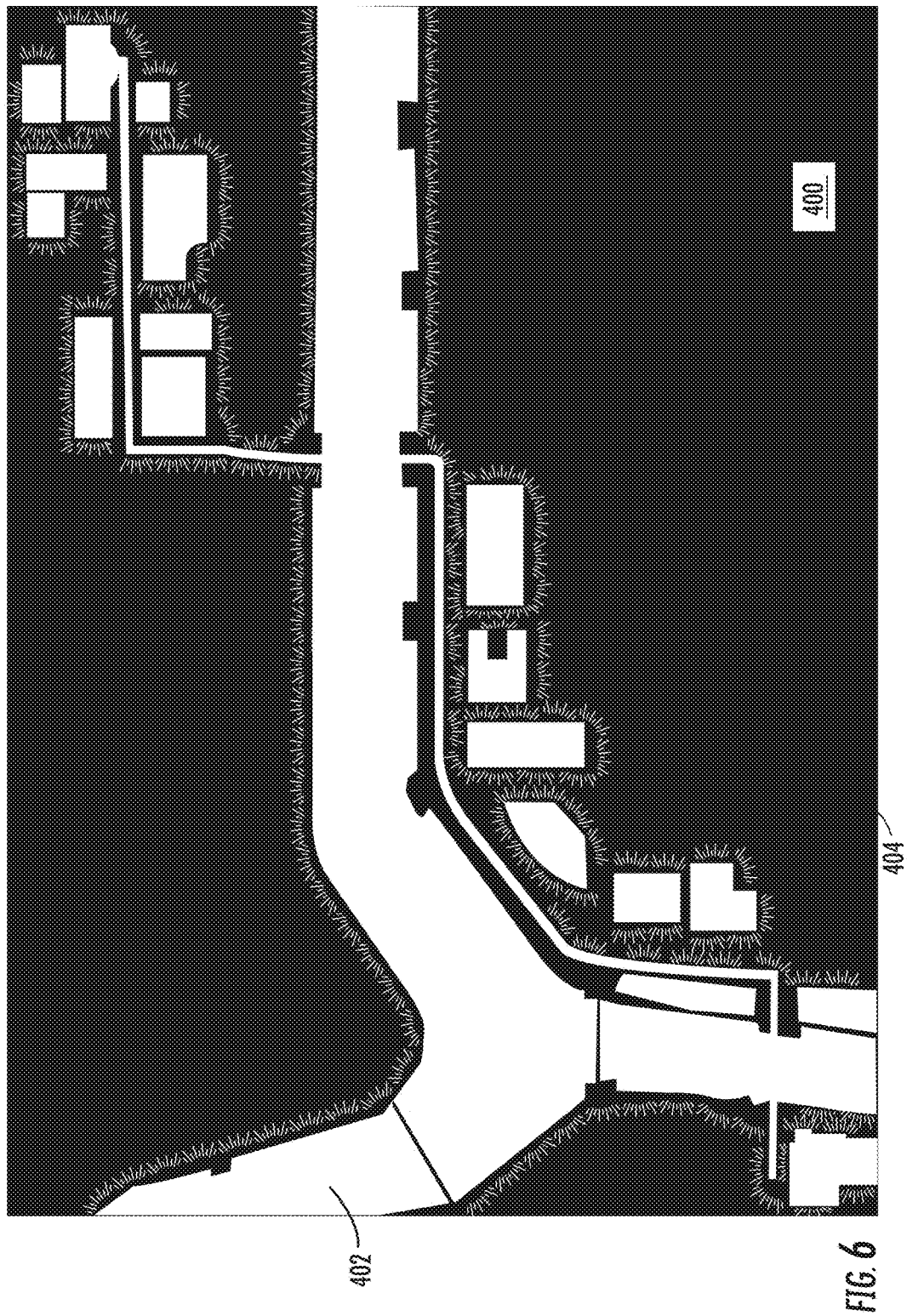
Figure 7:
Figure 8:
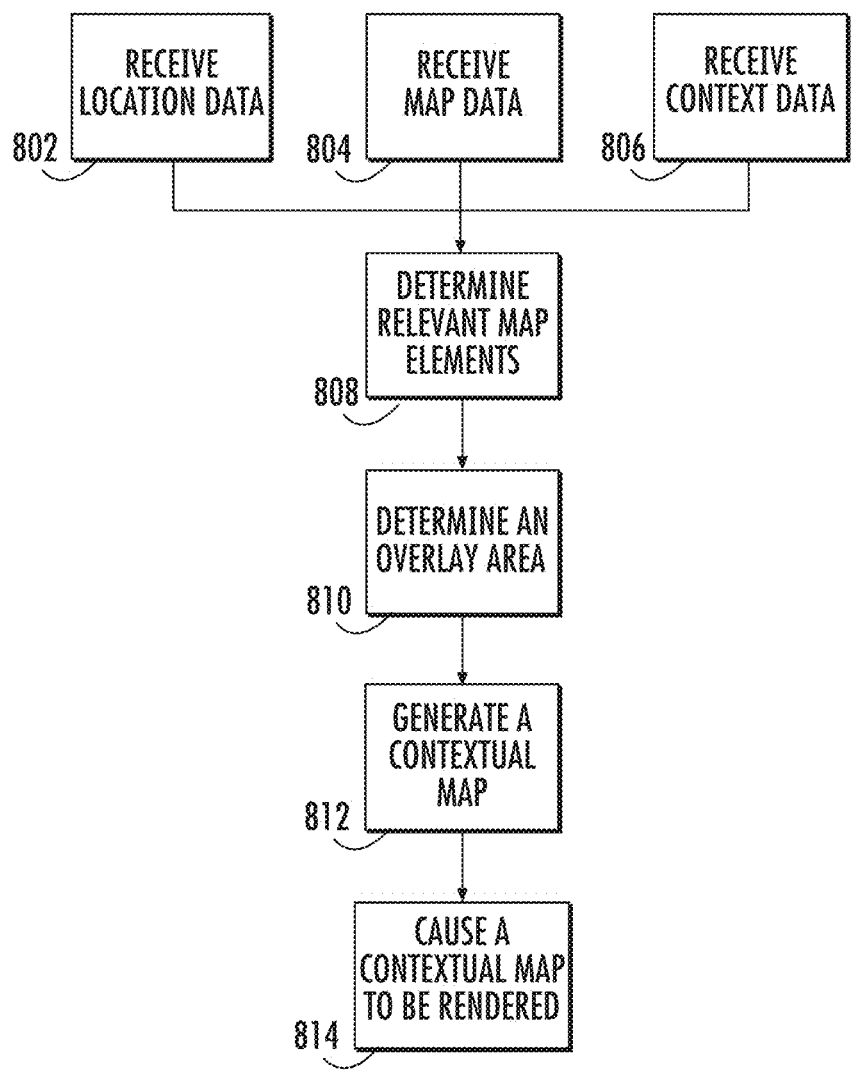

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for non-occluding overlay of user interface or information elements on a contextual map in accordance with an example embodiment of the present invention;

FIG. 3 illustrates an example depiction of a contextual map rendering with a non-occluded relevant element in accordance with an embodiment of the present invention;

FIGS. 4-7 illustrate example depictions of overlay area determinations in accordance with an embodiment of the present invention; and FIG. 8 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment for non-occluding overlay of user interface or information elements on a contextual map. FIG. 1 illustrates a communication diagram including user equipment (UE) 102, in communications with an a map database 104 and a location sensor 106. The UE 102 may include the map database 102 such as a map data memory, or be associated with the map database, such as a remote map data server. Similarly, the UE 102 may include the location sensor such as a global position system (GPS), radio frequency identification (RFID), Wi-Fi, cellular triangulation, or the like, or be associated with the location sensor, such as a tag reader which may determine the location of the UE by reading an active or passive location tag. The UE 102 may be a mobile computing device such as a laptop computer, tablet computer, mobile phone, smart phone, navigation unit, personal data assistant, or the like.

The UE 102 may receive location data from the location sensor 106. The location data may include the current location of the user and/or the UE 102 or a series of locations such past locations for a predetermined period of time, such as 30 seconds, 1 minute, 5 minutes, 30 minutes, or any other time period. Location data may also include destination location data, such as a specific address or business, or a destination area such as "uptown" Charlotte.

Additionally or alternatively, the UE 102 may receive location information by the user entering the location information using a user interface. For example, the user may enter a location or select a point on a map to indicate a location.

The UE 102 may receive map data from the map database 802. The map data may include the geographic elements, such as lakes, cities, topography, or the like and information elements such as roads, buildings, businesses, transit lines, parks, paths, walkways, or the like. In some instances map data may be received by the UE 102 in response to receiving location data. The UE 102 may request and receive map data associated with a current location and/or a destination location.

The UE 102 may determine relevant elements based on the location data to be those elements of the map data that the user may be expected to encounter. For example if the location data is stationary the relevant elements may be elements within a visible range to the user such as half a kilometer. In an example embodiment in which the location data is moving the relevant elements may be map elements in the direction of travel.

In an example embodiment, the UE 102 may receive context data. By way of example, the context data may be the type of travel, rate of travel, activity type of the user. The context data may be received from a user interface selection such as a selection of activity type, other information input, such as social media post, destination location and/or travel method or the like, or based on the location data or trend in location data. For example, the user may enter a type of travel into a navigation program and a destination. In another, example the user may enter a destination or activity into a social media posting, such as "going for a run to the Washington Monument." In this example of context data, running is the activity, pedestrian is the method of travel and the Washington Monument is the destination location. In another example, the UE 102 may interpret context data based on the location data and location data trend, such as the rate of change in location, indicative of the type of travel, and the route of the locations, e.g. following a road, walkways, transit line, or the like, to determine context data such as pedestrian using sidewalks, motor vehicle using streets, or passenger using transit system.

In an example embodiment in which the UE 102 receives context data, the UE may determine the relevant elements based on the location data and the context data to be those elements of the map data that the user may be expected to use. For example, in an instance in which the context data indicates that the user is a pedestrian using roads and walkways, the relevant elements may be roads and walkways which are connected within the current field of view. Streets without sidewalks or without safe travel may be determined as non-relevant. Similarly, transit lines may also be non-relevant. In an embodiment in which the context data indicates that the user is a passenger on a transit system, the transit system schematic may be determined as the relevant elements. The UE 102 may determine that streets without a transit station, or the like are non-relevant elements. In a further example, in which the context data includes a destination, the UE may determine a route or receive route information as a portion of the context data. The UE 102 may determine that streets and buildings along the route are relevant elements and elements outside of the route area are non-relevant elements.

In addition to travel method and route the context data may include anticipated activity such as eating at a restaurant, going to a movie, or the like, such as may be determined based upon a calendar appointment, social media posting, historical context data, or the like. The relevant elements may include restaurants, theaters, or the like near the user location or route.

The UE 102 may determine the relevant elements based on the current state of the contextual map, such as the zoom level, bounding box, and relevant focused items on the map. In an embodiment in which the map is a navigational map including a route along a path, the UE 102 may build a spatial data structure, such as R*Tree, quad tree, kd-tree, or the like to determine the relevant elements along the route. The spatial data structures may also be used to determine relevant elements in other map types, such as a transit map or schematic, a neighborhood map, a road or highway map, or the like.

The UE 102 may determine overlay areas in which the UE 102 may overlay additional information, such as user interface elements or information elements without occluding, e.g. covering, the relevant elements. User interface elements may be icons, images, or the like, which may be selectable by the user to cause an action on the UE 102 to be performed, such as menu icon; start, pause, or end navigation button, or the like. Information elements may be images, video, text, or the like related to one or more points of interest, route or other map element. For example, an information element may be a picture of a monument or a restaurant entrance, trailer for a movie showing at a theater, or a review, movie times, or other textual information, activity recommendations, such as restaurants, alternative venues for an activity, or the like. Additionally, information elements may be navigational information such as image icon, video, or text turn-by turn-directions, landmark based directions, or the like.

Figure 4:
Figure 5:
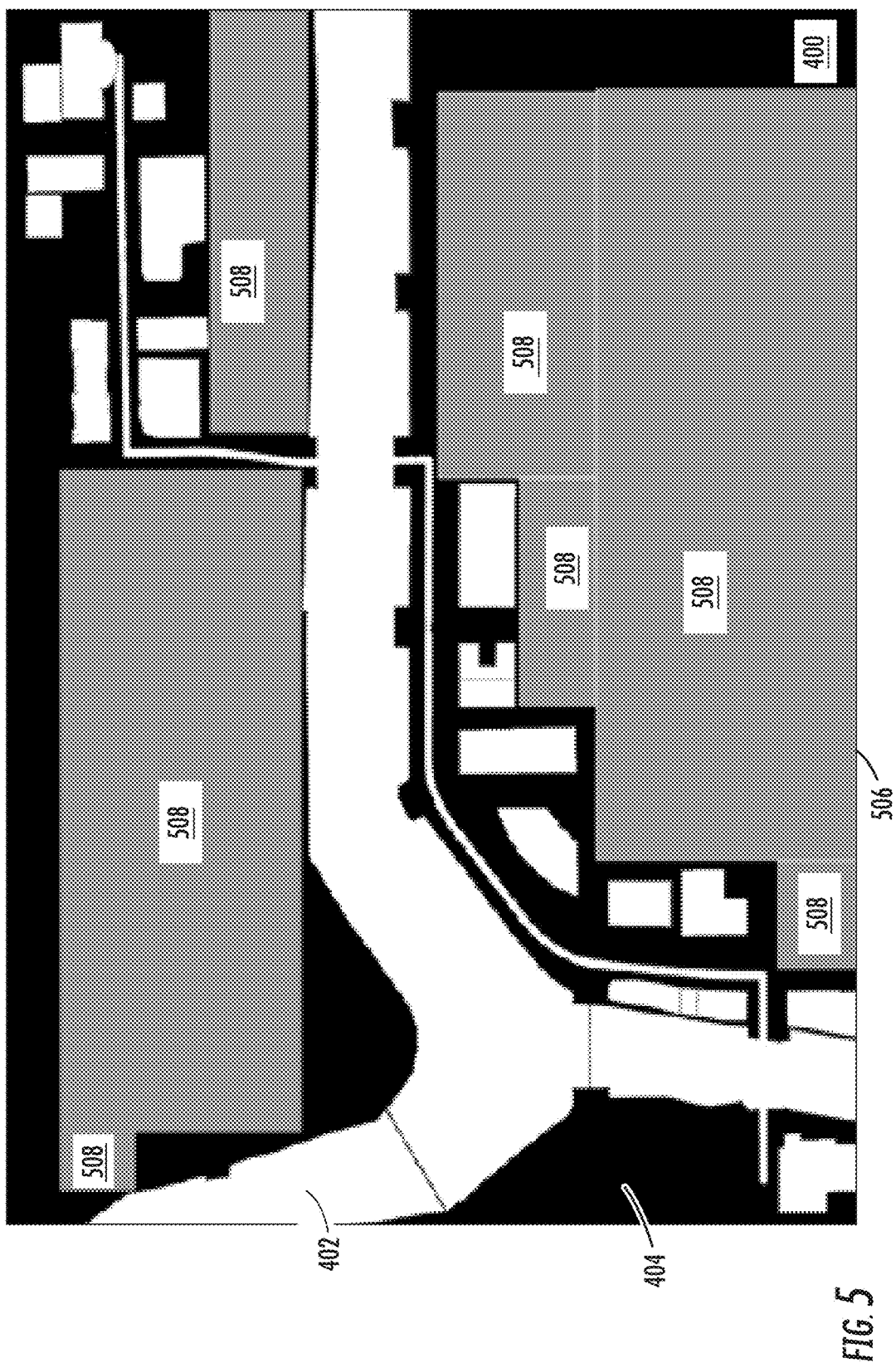

In an example embodiment, the UE 102 may determine an overlay area by generating a bit mask, as depicted in FIG. 4. The bit mask 400 may be generated by rendering all of the relevant elements 402 in one manner, such as a first color, e.g. white, and all free areas, which do not include relevant elements and/or include only non-relevant elements 404 in another manner, such as a second color, e.g. black. The UE 10 may partition the bitmask by a spatial decomposition algorithm, such as a quad tree as shown in FIG. 5. The spatial decomposition may result in free areas 506. The UE 102 may calculate the boundary boxes 508 from the free areas 506 which may be the overlay areas for information elements and user interface elements 308/310.

In an example embodiment, the spatial decomposition may be performed efficiently even on mobile devices, with limited processing power. Additionally the spatial decomposition may be performed at a lower resolution, e.g. ½, ¼ resolution, or the like, further increasing performance at loss of some accuracy.

In another example embodiment, the UE 102 may determine the overlay area by computing the signed distance field, as depicted in FIG. 6 based on the relevant elements and free areas or non-relevant elements. Similar to the bit mask, pixels which are in the relevant element areas 602 are rendered in one manner, such as a first color, e.g. white and the UE 102 may then use a local optimization algorithm, such as a simulated annealing or hill climbing, to determine the best placement of the information elements of user interface elements 308/310. The UE 102 would place the information element or user interface element 308/310 in an initial position and query the color of the pixels in alignment with, e.g. under the element. In an instance in which the information element or user interface element 308/310 placement overlaps a predetermined threshold number of white pixels, which may be programmed into the algorithm, the position of the information element or user interface element would not satisfy the algorithm by overlapping at least the threshold number of pixels and the information element or user interface element would be moved and the query performed again. The gradient provided by the signed distance field provides the algorithm with an indication of which direction to move the information or user interface element 308/310 for placement in the next iteration. The UE 102 may continue the process until the information element or user interface element 308/310 placement overlays only a free area, such as represented by black pixels, or satisfies the threshold number of pixels. The UE 102 may employ heuristics to increase the speed of the process, which may converge after several iterations.

The signed distance field may allow a real time or near real time calculation of the overlay area, even on a mobile device with limited graphic processor unit (GPU) power.

In a further example embodiment, the UE may determine the overlay area by weighting map elements based on relevance. The UE 102 may weight each element of the rendering or weight only the relevant elements of the rendering, assigning a default weight of zero to non-relevant elements and free areas. Each relevant element may be assigned an initial weight value, e.g. 1. The UE 102 may assign additional weight to elements based on based on proximity to the start location, proximity to the destination location, proximity to the route, activity, or the like, e.g. adding 1, or other predetermined amount to the initial value. The UE 102 may set one or more relevance thresholds for the weighted elements. A first weighted threshold may be a non-relevant threshold, the elements which were weighted as zero, e.g. non-relevant elements and free areas, may satisfy the first threshold. A second threshold may be the lesser important relevant threshold, that is, the elements which were determined to be relevant but not assigned additional weight may satisfy the second threshold. The elements that were assigned additional weight, may not satisfy either threshold and be determined as important relevant elements.

As depicted in FIG. 7, the UE 102 may weight areas of the mask 700 as non-relevant or free areas 704 which are represented in one manner, such as a first color, e.g. black, important relevant areas 702 which are represented in another manner, such as a second color, e.g. white, and lesser important relevant areas 706 which are represented in yet another manner, such as a third color, e.g. grey. For example, the UE 102 may determine that the areas near the start and end points of the route are important areas 702. The UE 102 may preclude the algorithms from placement of the information element or user interface elements 308/310 within the important areas 702. The UE 102 may determine intermediate areas of the route are less important relevant areas 706. The UE 102 may cause the algorithm to prefer free or black areas 704, but allow overlap into lesser important relevant areas, or grey areas 706 as necessary.

In an example embodiment using any of the above described methods of determining an overlay area, the percentage of overlay area may be computed by determining the ratio of the non-relevant areas to the relevant areas, such as the ratio of black verse white pixels of any of the map masks. In an instance in which the computed ratio is determine to be less than a predetermined threshold, e.g. the map would be too crowded to render a useful information element or user interface element 308/310 without occlusion of a relevant element, the UE 102 may use standard placement algorithms, or place the information element or user interface element outside of the map rendering area.

The UE 102 may generate the contextual map based on the map data, location data, context data and the overlay area. The UE 102 may overlay the information element or user interface element 308/310 in the contextual map in the overlay area. The UE 102 may cause the contextual map to be rendered on a user interface of the UE.

In an example embodiment, the UE 102 may differentiate the rendering of the relevant elements, such as changing the color, transparency, visibility, or the like, of the relevant areas in relation to the non-relevant elements. For example, the relevant elements may be in higher focus, rendered in greater detail be a brighter or more distinct color, rendered in color, or the like. In contrast the non-relevant elements may be out of focus or blurred, in dull colors or black and white, rendered in less detail, not rendered, or the like. As shown in FIG. 3, the relevant elements, of the map rendering 300, including the start locations 302, destination location 304, travel route 306, and buildings along the route 308 are rendered in more distinct colors than non-relevant buildings and roads not on the route. Information elements 310, including a text landmark based direction and an alternative restaurant recommendation, are depicted in areas, e.g. overlay areas including only non-relevant elements, therefore not occluding the relevant elements. Similarly, the picture icon 312 which may be an information element or a user interface element is depicted in an area which also does not occlude the relevant elements.

In instances in which the user interacts with the map, such as by changing zoom level, map boundary area, or the like, the bitmap, free space and boundary box, e.g. overlay areas may be recalculated for each map rendering.

Example Apparatus

A UE 102 may include or otherwise be associated with an apparatus 200 as shown in FIG. 2. The apparatus, such as that shown in FIG. 2, is specifically configured in accordance with an example embodiment of the present invention to provide for non-occluding overlay of user interface or information elements on a contextual map. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Process for Non-Occluding Overlay of
User Interface or Information Elements on a
Contextual Map Referring now to FIG. 8, the operations performed, such as by the apparatus 200 of FIG. 2, for non-occluding overlay of user interface or information elements on a contextual map are illustrated. As shown in block 802 of FIG. 8, the apparatus 200 may include means, such as a processor 202, a communications interface 206, or the like, configured to receive location data. The processor 202 may receive location data from communications interface 206 which in turn may receive the location data from the location sensor 106. The location data may include the current location of the user and/or the apparatus 200 or a series of locations such past locations for a predetermined period of time, such as 30 seconds, 1 minute, 5 minutes, 30 minutes, or any other time period. Location data may also include destination location data, such as a specific address or business, or a destination area such as "uptown" Charlotte.

Additionally or alternatively, the processor 202 may receive location information by the user entering the location information using a user interface 208. For example, the user may enter a location or select a point on a map to indicate a location.

As shown in block 804 of FIG. 8, the apparatus 200 may include means, such as a processor 202, a memory 204, a communications module 206, or the like, configured to receive map data. The processor 202 may receive the map data from the communications interface 206, which in turn, may receive the map data from a memory 204, such as map database 104. The map data may include the geographic elements, such as lakes, cities, topography, or the like and information elements such as roads, buildings, businesses, transit lines, parks, paths, walkways, or the like.

In some instances map data may be received by the processor 202 in response to receiving location data. The processor 202 may request and receive map data associated with a current location and/or a destination location.

As shown at block 806, of FIG. 8, the apparatus 200 may include means, such as a processor 202, memory 204, communications interface 206, or the like, configured to receive context data. The context data may be information relating to the context of the apparatus 200 or he user. For example, the context data may include the type of travel, rate of travel, or activity type of the user. The context data may be received from a user interface selection such as a selection of activity type, other information input, such as social media post, destination location and/or travel method or the like, or based on the location data or trend in location data. For example, the user may enter a type of travel into a navigation program and a destination using a user interface 208. In another, example the user may enter a destination or activity into a social media posting, such as going for a run to the Washington Monument." In this example of context data, running is the activity, pedestrian is the method of travel and the Washington Monument is the destination location. The processor 202 may receive the context information from the user interface 208 when it is entered, e.g. posted to the social media site. In another example embodiment, the processor 202 may receive the social media based context data from the communications interface 206, in an instance in which the processor 202 may cause a search of social media, or similar sites, for context data. In another example, the processor 202 may interpret context data based on the location data and location data trend, such as the rate of change in location, indicative of the type of travel, and the route of the locations, e.g. following a road, walkways, transit line, or the like, to determine context data such as pedestrian using sidewalks, motor vehicle using streets, passenger using transit system, or the like.

As shown at block 808 of FIG. 8, the apparatus 200 may include means, such as a processor 202, or the like, configured to determine relevant map elements. The processor 202 may determine relevant elements based on the location data to be those elements of the map data that the user may be expected to encounter. For example if the location data is stationary the relevant elements may be elements within a visible range to the user such as half a kilometer. In an example embodiment in which the location data is moving the relevant elements may be map elements in the direction of travel.

In an example embodiment in which the processor 202 receives context data, the processor may determine the relevant elements based on the location data and the context data to be those elements of the map data that the user may be expected to use. For example, in an instance in which the context data indicates that the user is a pedestrian using roads and walkways, the relevant elements may be roads and walkways which are connected within the current field of view. Streets without sidewalks or without safe travel may be determined as non-relevant. Similarly, transit lines may also be non-relevant. In an embodiment in which the context data indicates that the user is a passenger on a transit system, the transit system schematic may be determined as the relevant elements. The processor 202 may determine that streets without a transit station, or the like are non-relevant elements. In a further example, in which the context data includes a destination, the processor 202 may determine a route or receive route information as a portion of the context data. The processor 202 may determine that streets and buildings along the route are relevant elements and elements outside of the route area are non-relevant elements.

In addition to travel method and route, the context data may include anticipated activity such as eating at a restaurant, going to a movie, or the like, such as may be determined based upon a calendar appointment, a social media posting, historical context data, or the like. The processor 202 may determine relevant elements including restaurants, theaters, or the like near the user location, route, or destination location.

The processor 202 may determine the relevant elements based on the current state of the contextual map, such as the zoom level, bounding box, and relevant focused items on the map. In an embodiment in which the map is a navigational map including a route along a path, the processor 202 may build a spatial data structure, such as R*Tree, quad tree, kd-tree, or the like to determine the relevant elements along the route. The spatial data structures may also be used to determine relevant elements in other map types, such as a transit map or schematic, neighborhood map, road map, or the like.

Using FIG. 3 as an example, the relevant elements, of the map rendering 300, including the start locations 302, destination location 304, travel route 306, and buildings along the route 308 which are depicted in brighter color than the non-relevant elements and free areas.

As shown at block 810 of FIG. 8, the apparatus 200 may include means, such as a processor 202, or the like, configured to determine an overlay area. The processor 202 may determine overlay areas in which the processor may overlay additional information, such as user interface elements or information elements without occluding, e.g. covering, the relevant elements. User interface elements may be icons, images, or the like, which may be selectable by the user to cause an action on the processor to be performed, such as menu icon; start, pause, or end navigation button, or the like. Information elements may be images, video, text, or the like related to one or more points of interest, route or other map element. For example, an information element may be a picture of a monument or a restaurant entrance, trailer for a movie showing at a theater, or a review, movie times, or other textual information, activity recommendations, such as restaurants, alternative venues for an activity, or the like. Additionally, information elements may be navigational information such as image icon, video, or text turn-by-turn-directions, landmark based directions, or the like.

In an example embodiment, the processor 202 may determine an overlay area by generating a bit mask, as depicted in FIG. 4. The bit mask 400 may be generated by rendering all of the relevant elements 402 in one manner, such as a first color, e.g. white, and all free areas and/or non-relevant elements 404 in another manner, such as a second color, e.g. black. The processor 202 may partition the bitmask by a spatial decomposition algorithm, such as a quad tree as shown in FIG. 5. The spatial decomposition may result in free areas 506. The processor 202 may calculate the boundary boxes 508 from the free areas 506 which may be the overlay areas for information elements and user interface elements 308 and 310.

In an example embodiment, the spatial decomposition may be performed efficiently even on mobile devices, with limited processing power. Additionally the spatial decomposition may be performed at a lower resolution, e.g. ½, ¼ resolution, or the like, further increasing performance at loss of some accuracy.

In another example embodiment, the processor 202 may determine the overlay area by computing the signed distance field, as depicted in FIG. 6 based on the relevant elements and free areas or non-relevant elements. The signed distance field may provide a distance from a boundary, such as a relevant/non-relevant element boundary, for each pixel or pixel group these values may be referred to as gradients. Similar to the bit mask, pixels which are in the relevant element areas 602 are rendered in one manner, such as a first color, e.g. white and the processor 202 may then use a local optimization algorithm, such as a simulated annealing or hill climbing, to determine the best placement of the information elements of user interface elements 308/310. The processor 202 may place the information element of user interface element 308/310 and determine the overlap of the information element or user interface element and the relevant and non-relevant areas. If the information element or user interface element 308/310 overlaps greater than a predetermined threshold amount of relevant area, the processor 202 may move the information element or user interface element until the information element or user interface element does not overlap a relevant area or the overlap is less than the predetermined threshold.

By way of example, the processor 202 would place the information element or user interface element 308/310 in an initial position and query the color of the pixels under the element. In an instance in which the information element or user interface element 308/310 placement overlaps a predetermined threshold number of white pixels, which may be programmed into the algorithm, the position of the information element or user interface element not satisfy the algorithm threshold number of pixels and the information element or user interface element 308/310 would be moved and the query performed again. The gradient provided by the signed distance field provides the algorithm with an indication of which direction to place the information or user interface element 308/310 for the next iteration. The processor 202 may continue the process until the information element or user interface element 308/310 placement overlays only black pixels or satisfies the threshold number of pixels. The processor 202 may employ heuristics to increase the speed of the process, which may converge after several iterations.

The signed distance field may allow a real time or near real time calculation of the overlay area, even on a mobile device with limited graphic processor unit (GPU) power.

In a further example embodiment, the processor 202 may determine the overlay area by weighting map elements based on relevance. The processor 202 may weight each element of the rendering or weight only the relevant elements of the rendering, assigning a default weight of zero to non-relevant elements and free areas. Each relevant element may be assigned an initial weight value, e.g. 1. The processor 202 may assign additional weight to elements, that are determined to be more important, such as based on proximity to the start location, proximity to the destination location, proximity to the route, activity, or the like, e.g. adding 1 to the initial value. The processor 202 may set one or more relevance thresholds for the weighted elements. A first weighted threshold may be a non-relevant threshold, e.g. 0.5, elements which were weighted as zero, e.g. non-relevant elements and free areas, will the first threshold. A second threshold, e.g. 1.5, may be the lesser important relevant threshold, the elements which were determined to be relevant but not assigned additional weight may satisfy the second threshold. The elements that were assigned additional weight, may not satisfy either threshold and be determined as important relevant elements.

As depicted in FIG. 7, the processor 202 may weight areas of the mask 700 as non-relevant or free areas 704 in one manner, such a s in a first color, e.g. black, important relevant areas 702 in another manner, such as a second color, e.g. white, and lesser important relevant areas 706 in yet another manner, such as a third color, e.g. grey. For example, the processor 202 may determine that the areas near the start and end points of the route are important areas 702. The processor 202 may preclude the algorithms from placement of the information elements or user interface elements 308/310 within the important areas 702. The processor 202 may determine intermediate areas of the route are less important relevant areas 706. The processor 202 may cause the algorithm to prefer free or black areas 704, but allow overlap into lesser important relevant areas, or grey areas 706 as necessary.

In an example embodiment, the percentage of overlay area may be computed by determining the ratio of the non-relevant area and the relevant areas, such as the ratio of black verse white pixels of any of the map masks. In an instance in which the computed ratio is determined to be less than a predetermined threshold, e.g. the map would be too crowded to render a useful information element or user interface element 308/310 without occlusion of a relevant element, the processor 202 may use standard placement algorithms, or place the information element or user interface element outside of the map rendering area.

In instances in which the user interacts with the map, such as by changing zoom level, map boundary area, or the like, the bitmap, free space and boundary box, e.g. overlay areas may be recalculated for each map rendering.

As shown at block 812 of FIG. 8, the apparatus 200 may include means, such as a processor 202, or the like, configured to generate a contextual map. The processor 202 may generate the contextual map based on the map data, location data, context data and the overlay area. In an example embodiment, the processor 202 may differentiate the rendering of the relevant elements, such as changing the color, transparency, visibility, or the like, of the relevant areas in relation to the non-relevant elements. For example, the relevant elements may be in higher focus, rendered in greater detail, be a brighter color, rendered in color, or the like. In contrast, the non-relevant elements may be out of focus or blurred, in dull colors or black and white, rendered in less detail, not rendered, or the like. The processor 202 may overlay the information element or user interface element 308/310 in the contextual map in the overlay areas. As shown in FIG. 3, the relevant elements, of the map rendering 300, including the start locations 302, destination location 304, travel route 306, and buildings along the structure 308 are rendered in more distinct colors than non-relevant buildings and roads not on the route. Information elements 310, including a text landmark based direction and an alternative restaurant recommendation, are depicted in areas, e.g. overlay areas including only non-relevant elements, therefore not occluding the relevant elements. Similarly, the picture icon 312 which may be an informational element or a user interface element is depicted in an area which also does not occlude the relevant elements.

As shown at block 814 of FIG. 8, the apparatus 200 may include means, such as a processor 202, a user interface 306, or the like, configured to cause the contextual map to be rendered. The processor 202 may cause the contextual map to be rendered on a user interface 206.

By utilizing overlay areas the method, apparatus, and computer program product of an example embodiment may be able to render additional elements such as information elements and/or user interface elements within the map rendering area without occluding the view of the relevant elements of the rendering. The method, apparatus, and computer program product of an example embodiment would have an indication of where to place the additional elements and would not have to rely on standard placement algorithms which often place elements in areas without any relation to elements of the rendering, such as directly over the center of the rendering. The rendering area may also be maintained at full size, e.g. not reduced, while placing additional elements within the rendering area.

As described above, FIG. 8 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 806, 812, and 814 in FIG. 8. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving map data and location data;
   determining a context data of a user;
   determining, using a processor, relevant map elements satisfying a relevance threshold based at least in part on the location data and the context data;
   determining, using the processor, map elements failing to satisfy the relevance threshold;
   generating a map of a location including the relevant map elements satisfying the relevance threshold;
   determining an initial position within the map for an information element or user interface element within the map;
   determining a number of pixels by which the information element or user interface element overlaps relevant map elements satisfying the relevance threshold;
   repositioning or resizing the information element or user interface element in response to the number of overlapping pixels being above a predefined overlap pixel threshold;
   determining a number of pixels by which the repositioned information element or user interface element overlaps relevant map elements satisfying the relevance threshold; and
   causing the map to be rendered on a user interface with the repositioned information element or user interface element in response to the number of pixels by which the repositioned information element or user interface element overlaps relevant map elements satisfying the relevance threshold being below the overlap pixel threshold.

2. The method of claim 1, wherein context data comprises an indication that the user is at least one of a pedestrian using pedestrian pathways, a motor vehicle using streets, or a passenger using a transit system.

3. The method of claim 2, wherein determining relevant map elements satisfying a relevance threshold based at least in part on the context data comprises assigning a relatively higher relevance to a route having pedestrian access and a relatively lower relevance to a route without pedestrian access.

4. The method of claim 2, wherein a transit system stop is of a relatively higher relevance in response to the context data indicating that the user is a passenger using a transit system than if the context data indicates that the user is a motor vehicle using streets.

5. The method of claim 1, wherein generating a map of a location including the relevant map elements satisfying the relevance threshold comprises:
   generating an overlay area based on the relevant map elements, wherein map elements satisfying the relevance threshold are rendered in a first manner and areas not satisfying the relevance threshold are rendered in a second manner, distinct from the first manner.

6. The method of claim 5, wherein generating the overlay area based on the relevant map elements comprises computing a signed distance field and bit mask rendering areas corresponding to relevant map elements satisfying the relevance threshold in a first manner and rendering areas not satisfying the relevance threshold in a second manner, distinct from the first manner.

7. The method of claim 5, wherein generating the overlay area comprises weighting map elements based on relevance, wherein the overlay area comprises the map elements that satisfy a relevance threshold in an instance when the map elements are determined less important in comparison to other weighted map elements.

8. An apparatus comprising at least one processor and at least one memory including computer program code, the at least one memory and computer program code configured to, with the processor, cause the apparatus to at least:
   receive map data and location data;
   determine a context data of a user;
   determine relevant map elements satisfying a relevance threshold based at least in part on the location data and the context data;

determine map elements failing to satisfy the relevance threshold;

generate a map of a location including the relevant map elements satisfying the relevance threshold;

determine an initial position within the map for an information element or user interface element within the map;

determine a number of pixels by which the information element or user interface element overlaps relevant map elements satisfying the relevance threshold;

reposition or resize the information element or user interface element in response to the number of overlapping pixels being above a predefined overlap pixel threshold;

determine a number of pixels by which the repositioned information element or user interface element overlaps relevant map elements satisfying the relevance threshold; and cause the map to be rendered on a user interface with the repositioned information element or user interface element in response to the number of pixels by which the repositioned information element overlaps relevant map elements satisfying the relevance threshold being below the overlap pixel threshold.

9. The apparatus of claim 8, wherein context data comprises an indication that the user is at least one of a pedestrian using pedestrian pathways, a motor vehicle using streets, or a passenger using a transit system.

10. The apparatus of claim 9, wherein causing the apparatus to determine relevant map elements satisfying a relevance threshold based at least in part on the context data comprises causing the apparatus to assign a relatively higher relevance to a route having pedestrian access and a relatively lower relevance to a route without pedestrian access.

11. The apparatus of claim 9, wherein a transit system stop is of a relatively higher relevance in response to the context data indicating that the user is a passenger using a transit system than if the context data indicates that the user is a motor vehicle using streets.

12. The apparatus of claim 8, wherein causing the apparatus to generate a map of a location including the relevant map elements satisfying the relevance threshold comprises causing the apparatus to:

generate an overlay area based on the relevant map elements, wherein map elements satisfying the relevance threshold are rendered in a first manner and areas not satisfying the relevance threshold are rendered in a second manner, distinct from the first manner.

13. The apparatus of claim 12, wherein causing the apparatus to generate the overlay area based on the relevant map elements comprises causing the apparatus to compute a signed distance field and bit mask rendering areas corresponding to relevant map elements satisfying the relevance threshold in a first manner and rendering areas not satisfying the relevance threshold in a second manner, distinct from the first manner.

14. The apparatus of claim 12, wherein causing the apparatus to generate the overlay area comprises causing the apparatus to weight map elements based on relevance, wherein the overlay area comprises the map elements that satisfy a relevance threshold in an instance when the map elements are determined less important in comparison to other weighted map elements.

15. A computer program product comprising at least one non-transitory computer-readable storage medium having computer-executable program code portions stored therein, the computer-executable program code portions comprising program code instructions configured to:

receive map data and location data;

determine a context data of a user;

determine relevant map elements satisfying a relevance threshold based at least in part on the location data and the context data;

determine map elements failing to satisfy the relevance threshold;

generate a map of a location including the relevant map elements satisfying the relevance threshold;

determine an initial position within the map for an information element or user interface element within the map;

determine a number of pixels by which the information element or user interface element overlaps relevant map elements satisfying the relevance threshold;

reposition or resize the information element or user interface element in response to the number of overlapping pixels being above a predefined overlap pixel threshold;

determine a number of pixels by which the repositioned information element or user interface element overlaps relevant map elements satisfying the relevance threshold; and cause the map to be rendered on a user interface with the repositioned information element or user interface element in response to the number of pixels by which the repositioned information element or user interface element overlaps relevant map elements satisfying the relevance threshold being below the overlap pixel threshold.

16. The computer program product of claim 15, wherein context data comprises an indication that the user is at least one of a pedestrian using pedestrian pathways, a motor vehicle using streets, or a passenger using a transit system.

17. The computer program product of claim 16, wherein the program code instructions to determine relevant map elements satisfying a relevance threshold based at least in part on the context data comprises program code instructions to assign a relatively higher relevance to a route having pedestrian access and a relatively lower relevance to a route without pedestrian access.

18. The computer program product of claim 16, wherein a transit system stop is of a relatively higher relevance in response to the context data indicating that the user is a passenger using a transit system than if the context data indicates that the user is a motor vehicle using streets.

19. The computer program product of claim 15, wherein the program code instructions to generate a map of a location including the relevant map elements satisfying the relevance threshold comprises program code instructions to:

generate an overlay area based on the relevant map elements, wherein map elements satisfying the relevance threshold are rendered in a first manner and areas not satisfying the relevance threshold are rendered in a second manner, distinct from the first manner.

20. The computer program product of claim 19, wherein the program code instructions to generate the overlay area based on the relevant map elements comprises program code instructions to compute a signed distance field and bit mask rendering areas corresponding to relevant map elements satisfying the relevance threshold in a first manner and rendering areas not satisfying the relevance threshold in a second manner, distinct from the first manner.

* * * * *